Figure 1:
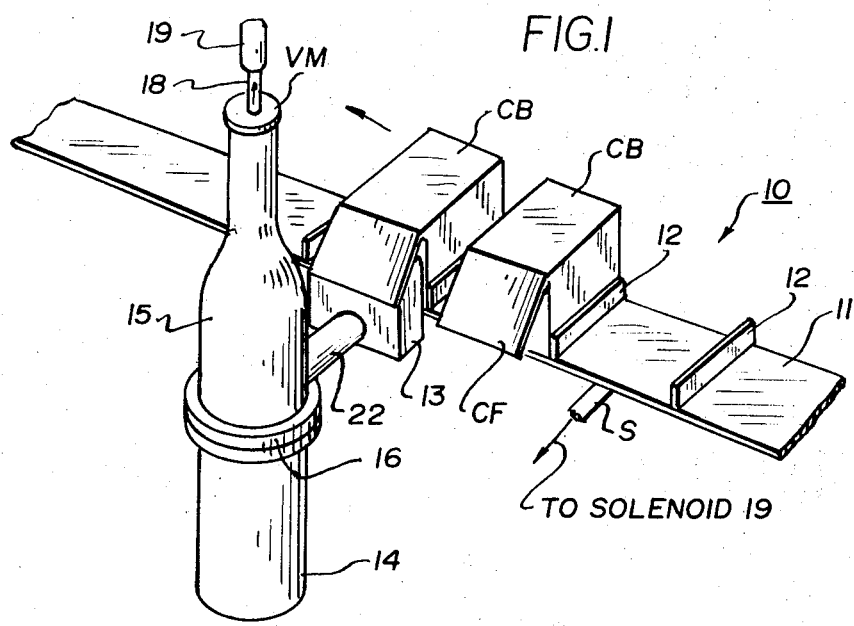

United States Patent [19]
Austin

[11] 3,801,266
[45] Apr. 2, 1974

[54] HOT AIR DIVERSION DEVICE

[75] Inventor: Timothy K. Austin, Santa Ana, Calif.

[73] Assignee: Container Corporation of America, Chicago, Ill.

[22] Filed: Mar. 15, 1973

[21] Appl. No.: 341,502

[52] U.S. Cl. .................................... 432/45, 34/48
[51] Int. Cl. ............................................. F27b 9/10
[58] Field of Search .................... 34/48; 432/45, 57

[56] References Cited
UNITED STATES PATENTS
3,562,920  2/1971  Vuilleumier et al. ................... 34/48
2,980,410  4/1961  Edvar .................................... 432/57

*Primary Examiner*—John J. Camby
*Attorney, Agent, or Firm*—Carpenter, Ostis & Lindberg

[57] ABSTRACT

A machine for conveying container bodies formed from paperboard having surface material thereon capable of being bonded together by the application of heat includes a nozzle for directing heated air against the surfaces, a conduit being connected between a source of heated air and the nozzle means. Structure is provided in the conduit for diverting heated air away from the nozzle when the conveyor is stopped, and comprises a first passage for heated air and valve structure at the end of the passage and normally closing the passage to the ambient. A second passage is concentric with the first passage and is connected to the nozzle, the second passage having an opening spaced from the valve structure for reversing the path of movement of the heated air to cause the air to be moved to the nozzle. A sensor responsive to the stopping of the conveyor is provided for opening the valve thereby diverting the heated air from the nozzle and into the ambient, and thereby preventing overheating of the selected surfaces of the container bodies.

2 Claims, 2 Drawing Figures

PATENTED APR 2 1974          3,801,266

HOT AIR DIVERSION DEVICE

BACKGROUND OF THE INVENTION

1. Field of the Invention

The structure according to the present invention relates generally to apparatus for closing the flaps of container bodies, where the flaps are coated with a heat activatable surface whereby two surfaces may be caused to adhere.

2. The Prior Art

This application represents an improvement of the structure shown in Vuilleumier U.S. Pat. No. 3,562,920. The prior art also appears to be exemplified in the following U.S. Pats.:

Haslacher, No. 2,423,237 Class: 154, subclass 42;

Scofield, Sr. et al., No. 3,226,278 Class: 156, subclass 497;

Hittenberger et al., No. 3,416,411 Class: 93, subclass 36

SUMMARY OF THE INVENTION

The structure according to the present invention relates generally to machines for closing flaps on a container body or the like, and has particular reference to an improved structure for closing the flaps of container bodies formed with heat activatable surface materials which can be sealed together upon the application of heat and pressure.

THE DRAWING

Figure 2:
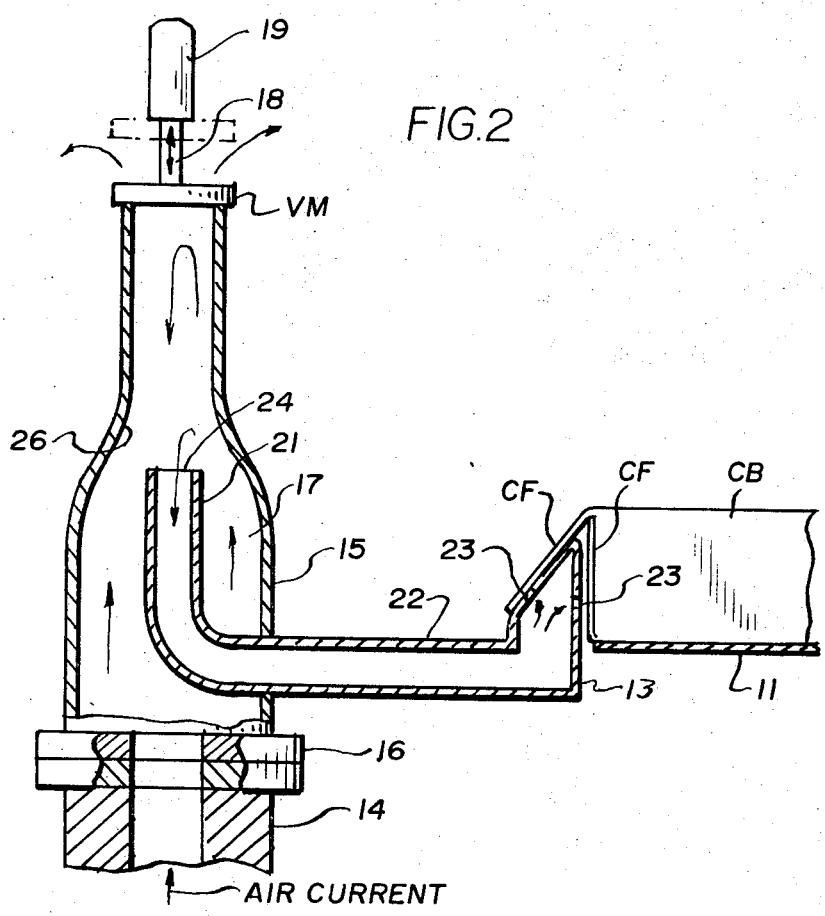

FIG. 1 is a schematic view of a mechanism embodying the principles of the present invention; and FIG. 2 is a vertical sectional view taken through a structure for supplying heated air to the mechanism seen in FIG. 1 and for diverting said air when the mechanism of FIG. 1 stops for some reason.

The improved mechanism according to the present invention is denoted by the reference numeral 10, and is shown in the environment of a conveyor 11 having flights 12 thereon for moving container bodies CB, each such container body CB having a pair of closure flaps CF at the end thereof and brought into face to face relationship and secured together. Selected surfaces of container body CV are provided with heat activatable coatings, particularly the closure flaps CF thereof, and the coatings are heated to activate the same, the flaps CF thereafter being brought into face to face relationship with each other.

Closure flaps CF are arranged to be heated by a nozzle structure 13 connected to a conduit 15 by a conduit 22. Conduit 15 and the heater device 14, through which a moving current of air is arranged to pass, are connected through the instrumentality of mating flanges 16.

Conduit 15 includes a first passage 17 for heated air from the heating device 14, and passage 17 is closed by a valve VM including an operator 18 therefor controlled in its operation by a solenoid 19. The latter is controlled by a sensing device S located adjacent the conveying reach 11, sensing device S being connected in circuitry to the solenoid 19. The arrangement is such that when conveying reach 11 ceases its motion, solenoid 19 is energized to open valve VM. However, when conveying reach 11 is operating and valve means VM is closed, a second passage 21 concentric with passage 17 is connected by a conduit 22 to the nozzle structure 13. The latter is provided with openings 23 for delivering heated air to the surfaces of the closure flaps CF to activate the coatings thereon.

When the valve VM is closed, the heated air supplied by heater 14 is reversed in direction at an opening 24 in the end of conduit 22, the heated air being discharged against the closure flaps CF at the openings 23 in nozzle structure 13.

However, upon cesation of movement of conveyor reach 11, valve VM opens, and the air moving in the passage 17 is no longer diverted into the conduit 22. It escapes from the conduit 17 when the valve VM is open to the ambient. The end of the conduit 21 is located adjacent to a necked-in portion 26 in conduit 15, and a Venturi effect is created greatly reducing the pressure at the opening 24 in the conduit 22. Such reduction in pressure at the Venturi section 26 causes the air to be reversed in direction in the conduit 22 thereby removing heat from the nozzle 13 and the discharge opening 23 thereof.

I claim:

1. In a machine for conveying container bodies formed from paperboard or the like and for bonding selected surfaces thereon:
   a. nozzle means for directing heated air against said selected surfaces;
   b. a conduit connected between a source of heated air and said nozzle means;
   c. means in said conduit for diverting heated air away from said nozzle means upon stopping of said conveyor comprising:
      i. a first passageway for heated air including valve means at the end of said passageway normally closing same to the ambient;
      ii. a second passageway concentric with said first passageway and connected to said nozzle means;
      iii. said second passageway having an opening spaced from said valve means for reversing the path of movement of the heated air to cause the air to be moved to said nozzle means;
      iv. means responsive to stopping of said conveyor for opening said valve means to divert heated air from the nozzle means and into the ambient thereby preventing overheating of said selected surfaces.

2. A machine according to claim 1, wherein said first passageway has a necked-in portion at the location of the opening of said second passageway for creating a Venturi effect at said opening thereby reducing the pressure thereat and reversing the direction of heated air in said second passageway when said valve means is opened.

* * * * *